(12) United States Patent
Calkins et al.

(10) Patent No.: US 11,286,042 B2
(45) Date of Patent: Mar. 29, 2022

(54) METHODS, SYSTEMS, AND APPARATUSES FOR IN-LINE VARIABLY POROUS SURFACES

(71) Applicant: The Boeing Company, Chicago, IL (US)

(72) Inventors: Frederick Theodore Calkins, Renton, WA (US); Douglas E. Nicholson, Saint Charles, MO (US); Jordan Kreitzman, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 16/100,412

(22) Filed: Aug. 10, 2018

(65) Prior Publication Data

US 2020/0047875 A1 Feb. 13, 2020

(51) Int. Cl.
| | | |
|---|---|---|
| *B64C 21/08* | (2006.01) | |
| *B64C 21/02* | (2006.01) | |
| *B29C 61/06* | (2006.01) | |
| *B64D 33/02* | (2006.01) | |

(52) U.S. Cl.
CPC ............. *B64C 21/08* (2013.01); *B64C 21/02* (2013.01); *B64C 21/025* (2013.01); *B29C 61/06* (2013.01); *B64C 2230/20* (2013.01); *B64D 2033/0206* (2013.01)

(58) Field of Classification Search
CPC ....... B64C 21/02; B64C 21/025; B64C 21/08; B64C 2230/06; B64C 2230/20; B64D 2033/0206
See application file for complete search history.

(56) References Cited

U.S. PATENT DOCUMENTS

| | | | | |
|---|---|---|---|---|
| 1,889,477 A | * | 11/1932 | Hitt ........................ | B64C 3/54 244/204 |
| 2,077,072 A | * | 4/1937 | Rose ...................... | B64C 21/02 244/204 |
| 3,991,849 A | | 11/1976 | Green et al. | |
| 4,522,360 A | * | 6/1985 | Barnwell .............. | B64C 21/025 244/130 |
| 5,590,854 A | * | 1/1997 | Shatz ..................... | B64C 1/12 244/130 |

(Continued)

FOREIGN PATENT DOCUMENTS

| | | |
|---|---|---|
| EP | 0102180 B1 | 10/1986 |
| EP | 0532093 A1 | 3/1993 |
| WO | 2004097218 A2 | 11/2004 |

OTHER PUBLICATIONS

Goodfellow, Magnetic Shape Memory Alloy—Introduction, Properties and Applications, Oct. 27, 2015, https://www.azom.com/article.aspx?ArticleID=10525 (Year: 2015).*

(Continued)

*Primary Examiner* — Richard R. Green
*Assistant Examiner* — Arfan Y. Sinaki
(74) *Attorney, Agent, or Firm* — Coats & Bennett, PLLC

(57) ABSTRACT

Variably porous panels and panel assemblies incorporating shape memory alloy components along with methods for actuating the shape memory alloys are disclosed to predictably alter the porosity of a substrate surface, with the shape memory alloy maintained in an orientation relative to the panel that is in-plane with a mold-line of the panel outer surface.

22 Claims, 7 Drawing Sheets

(56) References Cited

U.S. PATENT DOCUMENTS

| | | | |
|---|---|---|---|
| 6,065,934 A * | 5/2000 | Jacot | F03G 7/065 |
| | | | 244/99.8 |
| 6,286,789 B1 * | 9/2001 | Shimovetz | B64C 3/54 |
| | | | 244/201 |
| 6,368,059 B1 * | 4/2002 | Maines | B63H 1/15 |
| | | | 415/914 |
| 7,878,459 B2 * | 2/2011 | Mabe | B64C 9/32 |
| | | | 244/213 |
| 8,251,317 B2 * | 8/2012 | Pitt | B64C 21/08 |
| | | | 244/204 |
| 9,334,059 B1 | 5/2016 | Jones et al. | |
| 9,649,780 B1 * | 5/2017 | Benafan | E21B 43/267 |
| 2005/0121240 A1 | 6/2005 | Aase et al. | |
| 2007/0205853 A1 * | 9/2007 | Taya | F03G 7/065 |
| | | | 335/205 |
| 2009/0206504 A1 | 8/2009 | Campbell et al. | |
| 2009/0261204 A1 | 10/2009 | Pitt | |

OTHER PUBLICATIONS

NASA, "Variable-Depth, Multi-Layer Liner for Aircraft Noise Reduction," NASA Technology Transfer Program, NASA Langley Research Center, Hampton, VA; retrieved from internet May 28, 2018: https://technology.nasa.gov/patent/LAR-TOPS-256, pp. 1-2.

Stockton, N., "These Shapeshifting Metals Could be the Future of Flight," Wired, Dec. 3, 2017, available at https://wired.com/story/shape-memory-alloys/, pp. 1-14.

Berton, J., et al., "A Requirements-Driven Optimization Method for Acoustic Liners using Analytic Derivatives," 23rd AIAA/CEAS Aeroacoustics Conference, Denver, CO, Jun. 5, 2017, AIAA 2017-3023, pp. 1-13.

* cited by examiner

METHODS, SYSTEMS, AND APPARATUSES FOR IN-LINE VARIABLY POROUS SURFACES

STATEMENT OF POTENTIAL GOVERNMENT RIGHTS

The invention described herein was made in the performance of work under NASA Contract No. NNC16AA04A and is subject to the provisions of Section 305 of the National Aeronautics and Space Act of 1958 (72 Stat.435: 42U.S.C.2457).

TECHNOLOGICAL FIELD

The present disclosure relates generally to the field of panels, panel assemblies and substrates that include shape memory alloys. More specifically the present disclosure relates to the field of using shape memory alloys to predictably alter the porosity of surfaces on aircraft.

BACKGROUND

Improvement of aerodynamics as well as performance through the use of passive porosity on aircraft has been demonstrated. Passive porosity refers to applying pores or openings to various locations on the surface of an aircraft to predictably alter or "condition" an airstream boundary layer as air passes over and otherwise impacts the porous aerodynamic surfaces. In the past, the use of passive porosity on aircraft was directed to sets of fixed holes or pores located at various surfaces.

For example, at certain velocities, an airflow or airstream impacts non-porous surfaces existing at various locations on an aircraft surface. Such aircraft surfaces include, for example, an air intake at an engine assembly, or other surfaces including those surfaces considered to be aerodynamic surfaces. At times, including takeoff, acceleration in flight, and landing, for example, airflow impacting aircraft surfaces can cause or exacerbate air turbulence at such surfaces, with such turbulence including, at high-velocities, shockwaves. The porosity of such surfaces is known to impact the interaction of such airflow with aircraft surfaces.

Shape memory alloys (referred to equivalently herein as "SMAs") are a class of active materials that convert thermal energy into mechanical energy. Heating the material above its austenitic transformation temperature induces a change in the SMA microstructure, known as the Shape Memory Effect (SME), which results in a macroscopic shape change to a stable, defined austenitic shape. When cooled below its transformation temperature, the SMA transforms into its martensitic crystal form. Due to the many variants of crystal structure in the martensitic phase, as the material cools it can be deformed by external loads or internal stresses applied to the material. Thermomechanical processing enables the SMA to recover a defined martensitic shape in addition to the austenitic shape; a property known as the Two-Way-Shape-Memory-Effect (TWSME). This shape change process can be repeated and controlled by managing the SMA temperature. The SMA shape change can be in response to environmental temperature changes, for example, due to a change in aircraft altitude or engine setting, or it can be controlled by direct heating via heaters or electric current. The phase change creates not only a macroscopic shape change but also a change in mechanical and electrical properties, including elastic modulus and electrical resistivity.

SUMMARY

An aspect of the present application discloses a panel and a panel assembly with the panel assembly including a panel having a panel inner surface and a panel outer surface and at least one through opening through the thickness of the panel. The panel assembly further includes a shape memory alloy component oriented proximate to the panel inner surface. The shape memory alloy component has a first dimension in a non-activated state and at least a second dimension or a plurality of dimensions in an activated state, with the second dimension and plurality of dimensions of the shape memory alloy component in the activated state differing from the first dimension of the shape memory alloy component in the non-activated state. The shape memory alloy is maintained in an orientation relative to the panel that is in-plane with a mold-line of the panel outer surface. The panel assembly further includes an initial porosity in the non-activated state and the panel assembly has a second or a plurality of porosities in the activated state, with the second and plurality of porosities differing from the initial porosity.

Another aspect of the present application discloses a variable porosity system for a vehicle surface including a panel having a panel inner surface and a panel outer surface and at least one through opening through the thickness of the panel. The panel assembly further includes a shape memory alloy component oriented proximate to the panel inner surface. The shape memory alloy component has a first dimension in a non-activated state and at least a second dimension or a plurality of dimensions in an activated state, with the second dimension and plurality of dimensions of the shape memory alloy component in the activated state differing from the first dimension of the shape memory alloy component in the non-activated state. The system further includes an actuator in communication with the shape memory alloy component, and a controller in communication with the actuator. The shape memory alloy in the activated state and in the non-activated state is maintained in an orientation relative to the panel that is in-plane with a mold-line of the panel outer surface. In another aspect, the actuator includes at least one of a heating element, a cooling element and a means for producing a magnetic field, including, for example, a magnet, such as, for example, an electromagnet capable of providing a variable magnetic field to a shape memory alloy component, with a magnitude ranging from about 0.5 T to about 2.0 T.

In a further aspect, a method for changing porosity of a part is disclosed, with the method including providing a part having a first porosity. The part includes a substrate that further includes a substrate outer surface and a substrate inner surface. The part further includes a shape memory alloy component, with the shape memory alloy component having an initial dimension in a non-activated state and having a second dimension or a plurality of second dimensions in an activated state. The method further includes activating the shape memory alloy component to form a shape memory alloy component in an activated state, and changing the dimension of the shape memory alloy component from the initial dimension to the second dimension or any of the plurality of second dimensions. The second dimension, or any of the plurality of second dimensions, of the shape memory alloy component in the activated state are different from the initial dimension of the shape memory alloy component in the non-activated state. The method further includes maintaining the shape memory alloy component in an orientation relative to the substrate outer surface that is in-plane with a mold-line of the substrate outer surface, and changing the porosity of the part from a first porosity to a second porosity or a plurality of porosities, with the second porosity and the plurality of porosities differing from the initial porosity of the part.

Further aspects of the present application disclose vehicles that include the panels, panel assemblies and systems as described herein, with the vehicles including at least one of: a manned aircraft; an unmanned aircraft; a manned spacecraft; an unmanned spacecraft; a manned rotorcraft; an unmanned rotorcraft; a manned terrestrial vehicle; a unmanned terrestrial vehicle; a unmanned terrestrial vehicle; a manned surface water borne vehicle; an unmanned surface water borne vehicle; a manned sub-surface water borne vehicle; an unmanned sub-surface water borne vehicle; and further incorporating the presently disclosed panels and panel assemblies on missiles, satellites, and the like.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1C:
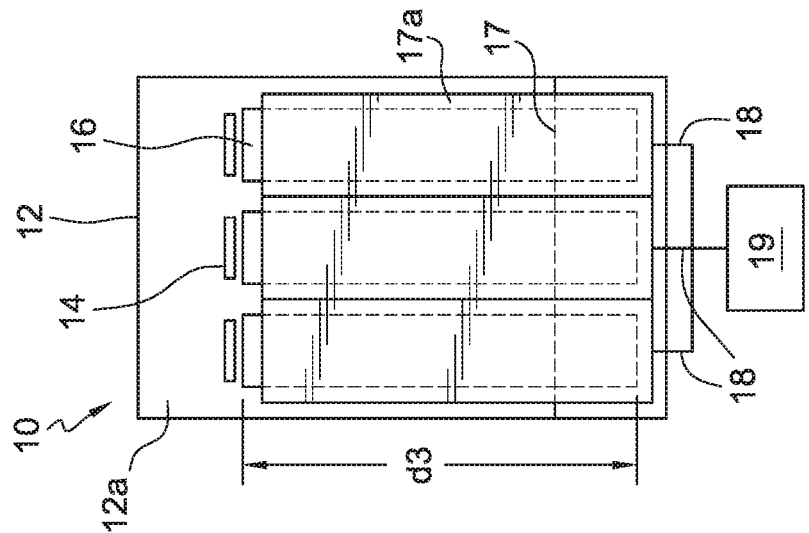
Figure 1B:
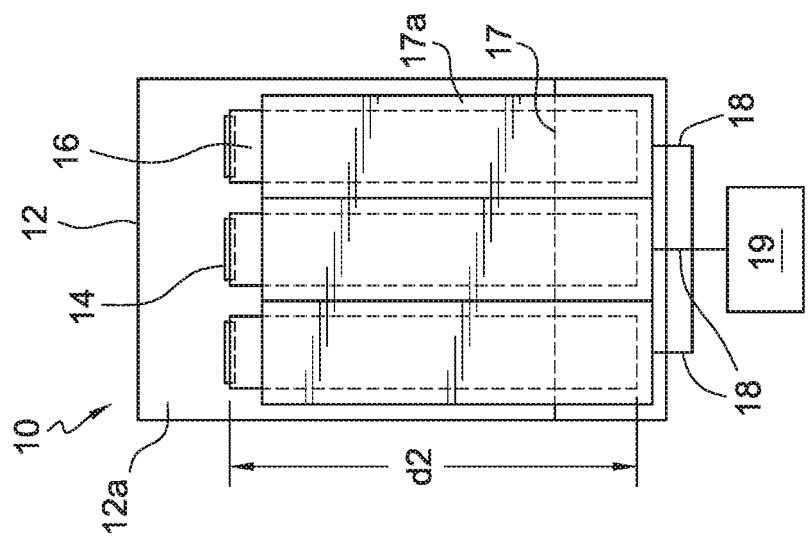
Figure 1A:
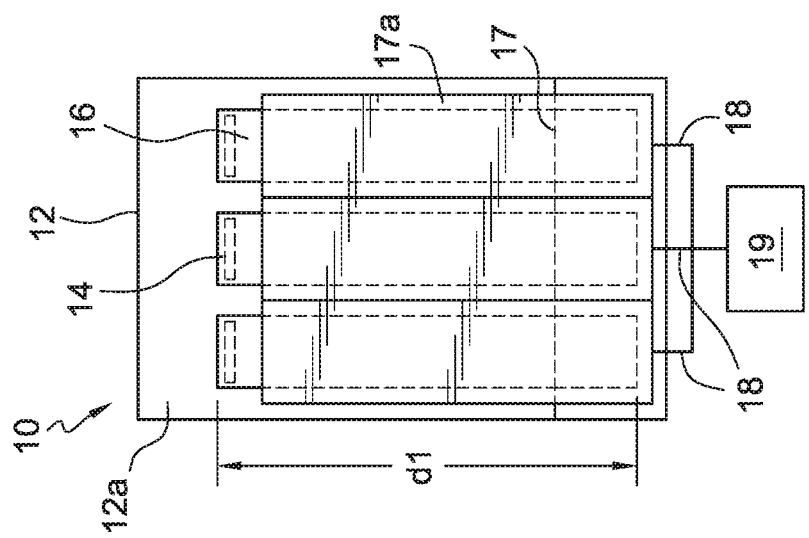

Having thus described variations of the disclosure in general terms, reference will now be made to the accompanying drawings, which are not necessarily drawn to scale, and wherein:

FIG. 1A is an illustration of a panel according to aspects of the present disclosure showing an interior view of a panel in a non-actuated state with the axial slit in a "closed" orientation;

FIG. 1B is an illustration of a panel according to aspects of the present disclosure showing an interior view of the panel shown in FIG. 1A in an actuated state, with the axial slits in a "partially open" orientation.

Figure 2C:
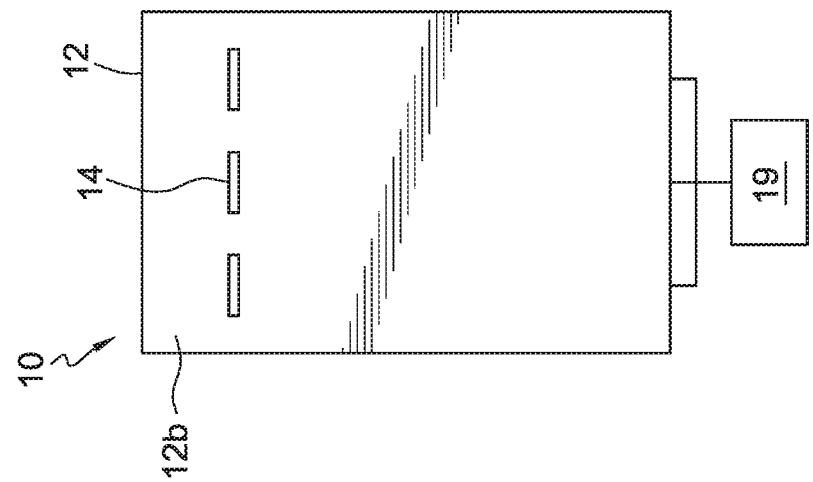
Figure 2B:
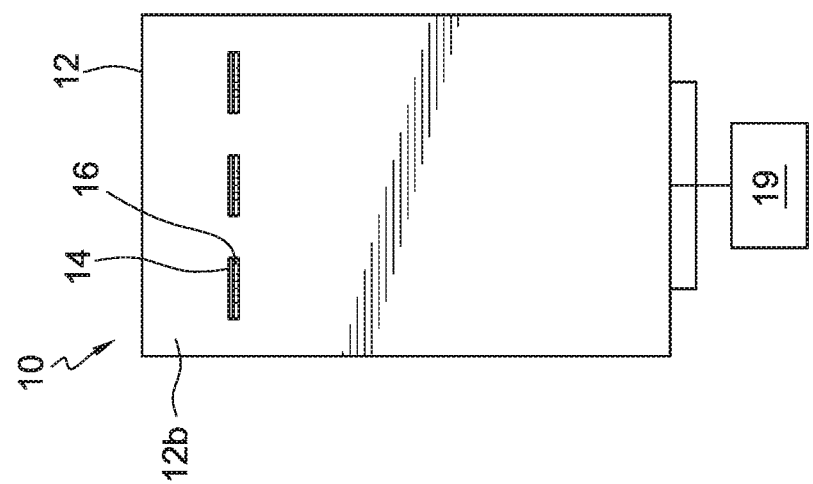
Figure 2A:
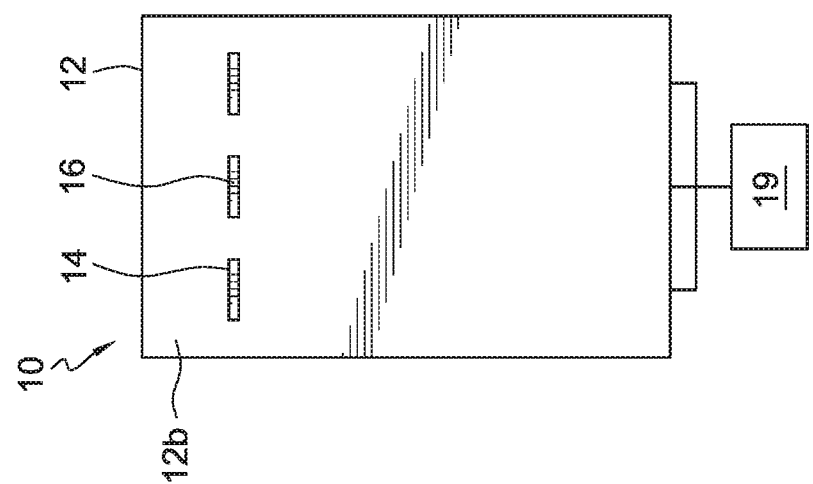

FIG. 1C is an illustration of a panel according to aspects of the present disclosure showing an interior view of the panel shown in FIG. 1A in an actuated state with axial slits in an "open" orientation;

FIG. 2A is an illustration of a panel according to aspects of the present disclosure showing an exterior view of a panel shown in FIG. 1A a non-actuated state with the axial slit in a "closed" orientation;

FIG. 2B is an illustration of a panel according to aspects of the present disclosure showing an interior view of the panel shown in FIG. 2A in an actuated state, with the axial slits in a "partially open" orientation.

Figure 3:
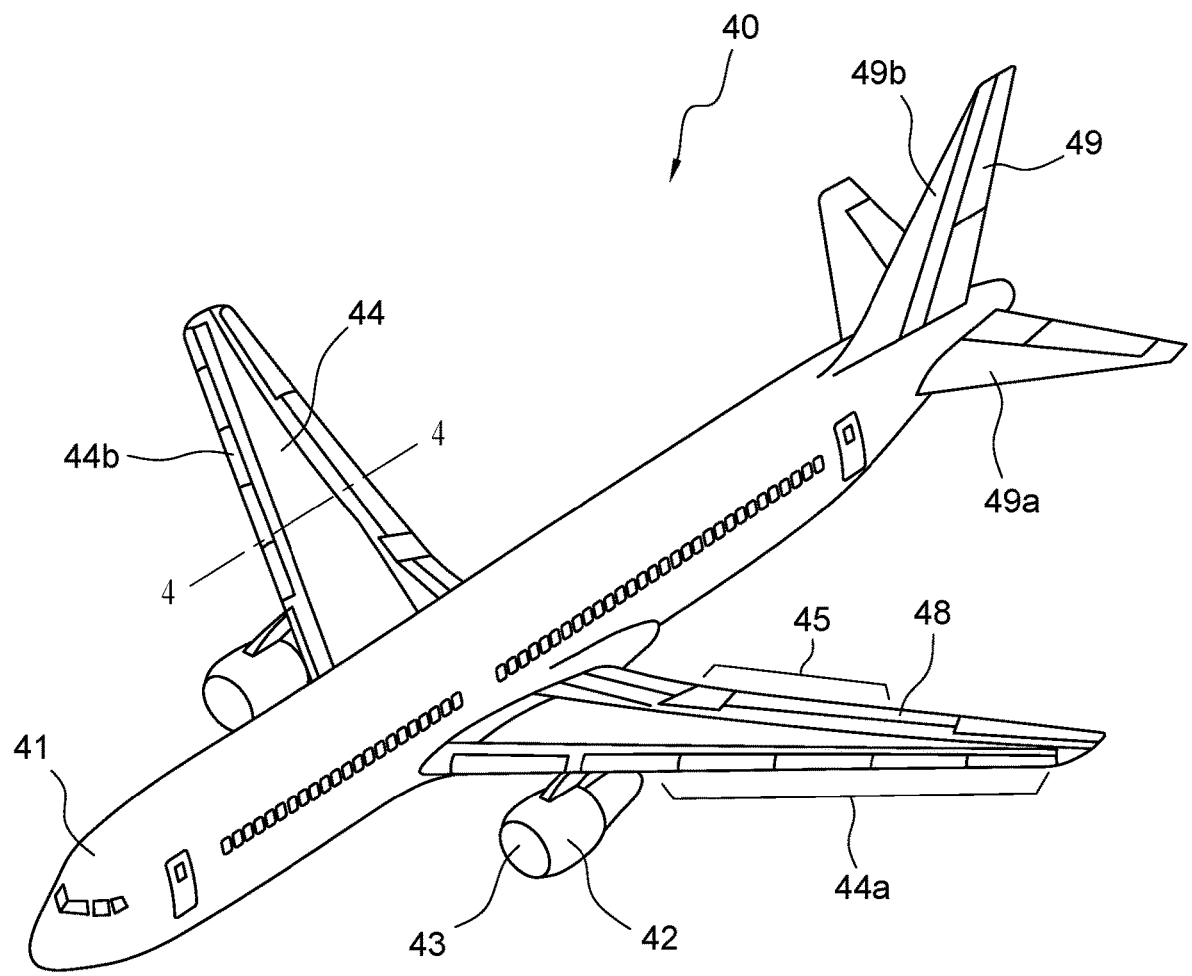
Figure 4:
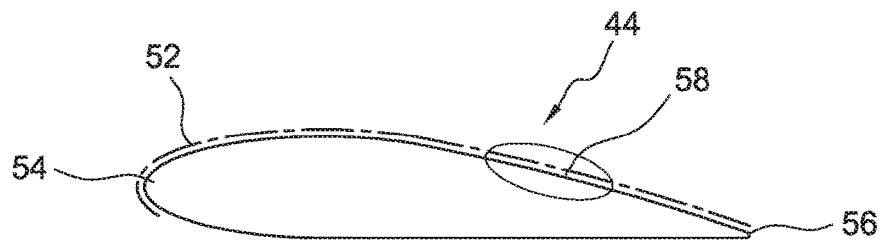
Figure 5A:
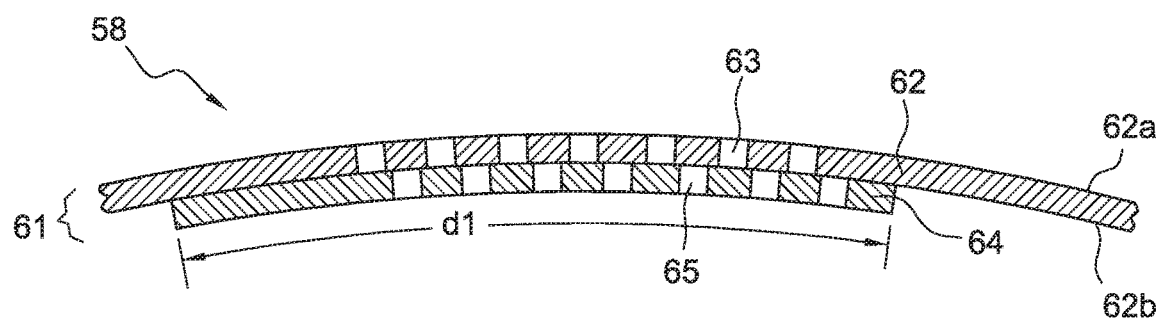
Figure 5B:
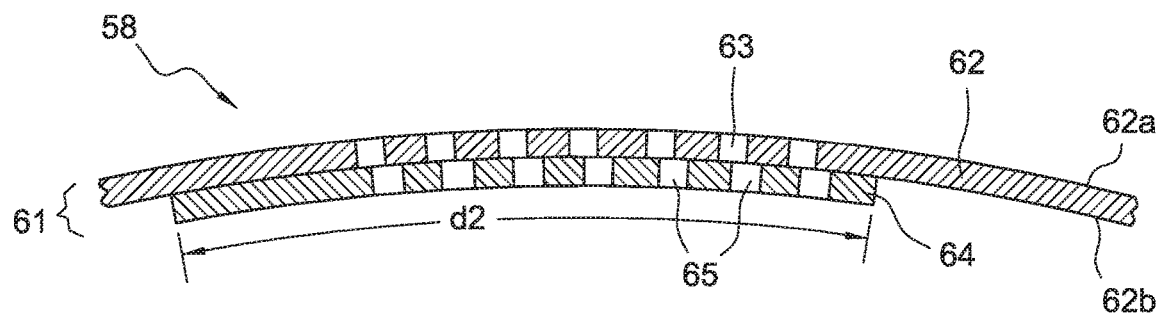
Figure 5C:
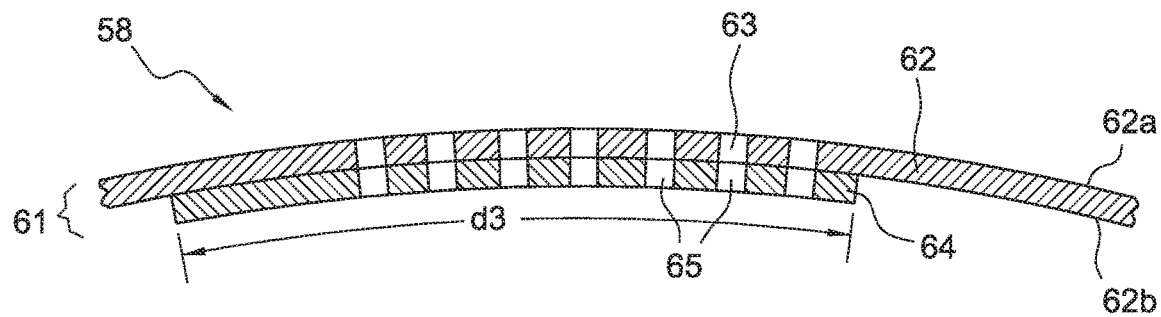
Figure 6A:
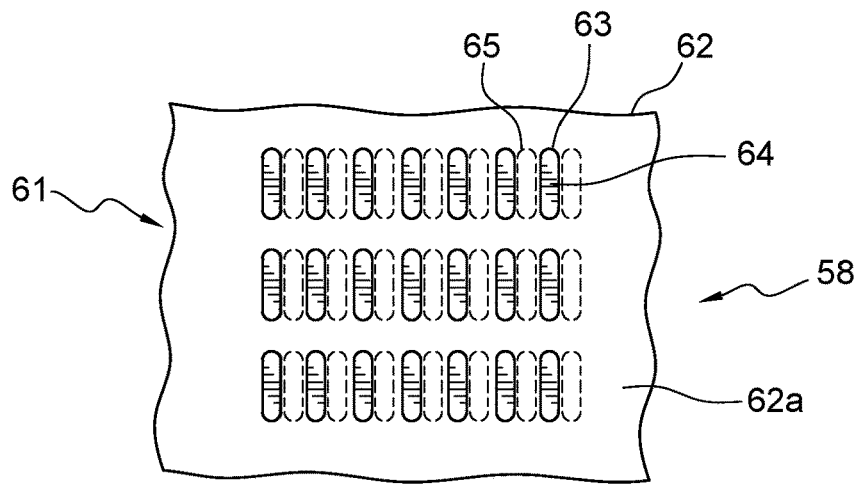
Figure 6B:
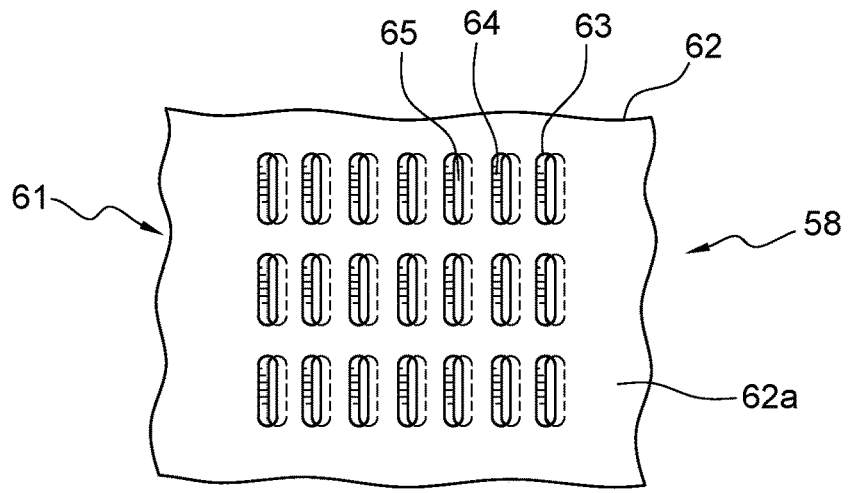
Figure 6C:
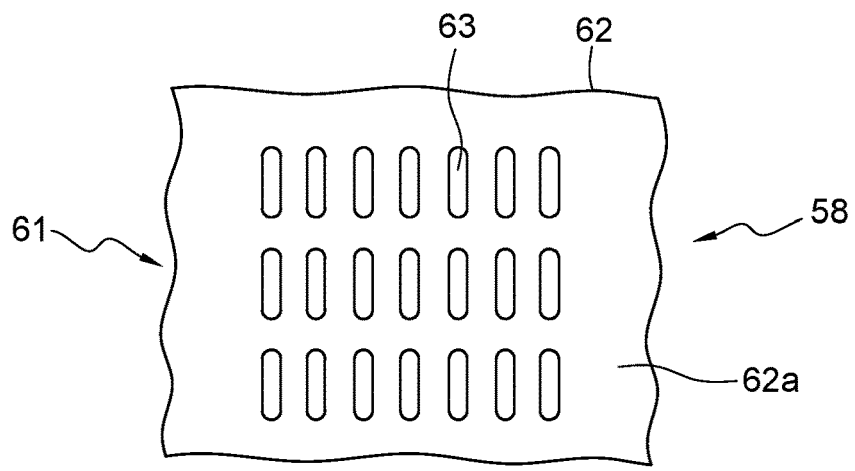
Figure 7:
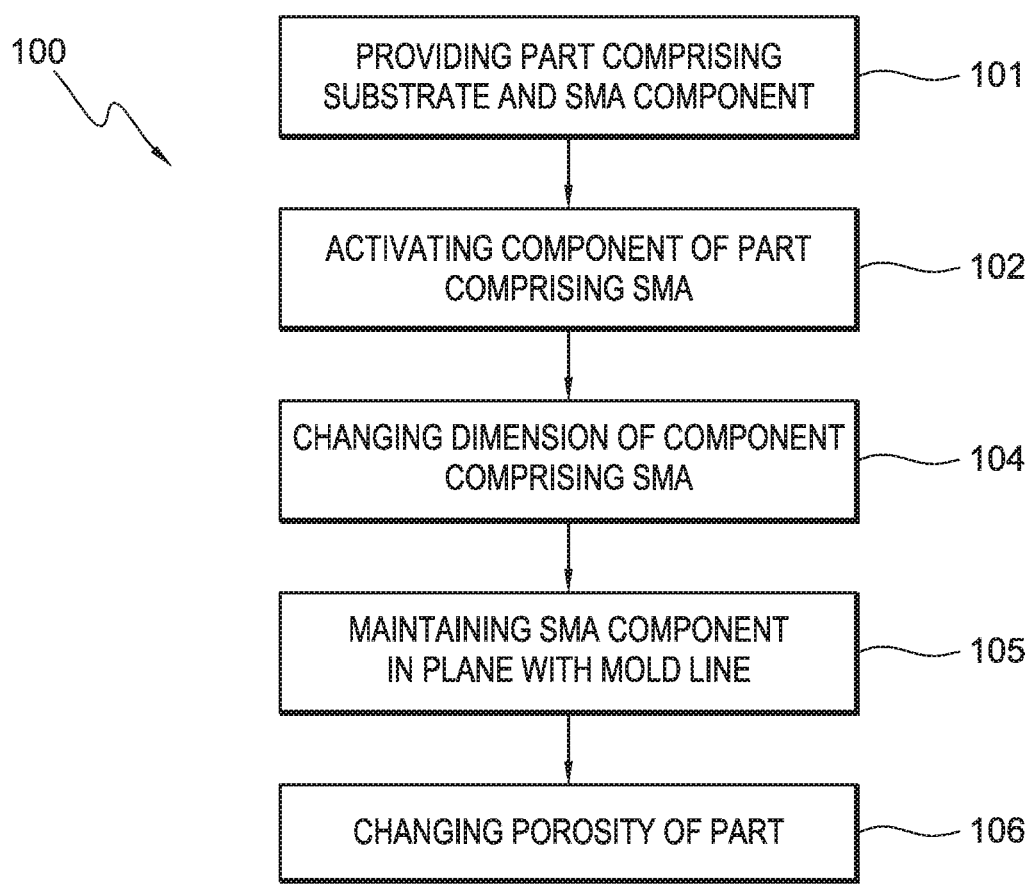
Figure 8:
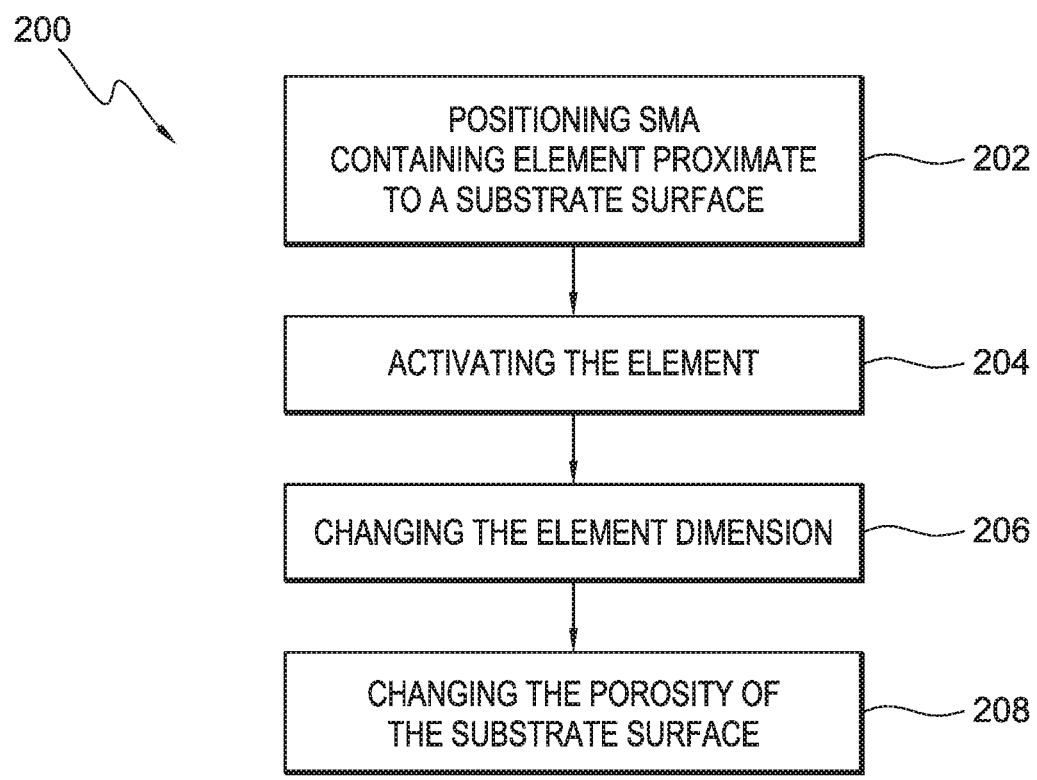

FIG. 2C is an illustration of a panel according to aspects of the present disclosure showing an interior view of the panel shown in FIGS. 2A and 2B in an actuated state, with the axial slits in an "open" configuration;

FIG. 3 is an illustration of an aircraft according to an aspect of the present disclosure;

FIG. 4 is an illustration of a cross-sectional side view of a wing assembly of the aircraft shown in FIG. 4, according to aspects of the present disclosure;

FIG. 5A is an enlarged cross-sectional side view of the wing assembly shown in FIG. 4, and according to an aspect of the present disclosure, with axial slits in a facesheet having a "closed" orientation;

FIG. 5B is an enlarged cross-sectional side view of the wing assembly shown in FIG. 4, and according to an aspect of the present disclosure, with axial slits in a facesheet having a "partially open" orientation;

FIG. 5C is an enlarged cross-sectional side view of the wing assembly shown in FIG. 6, and according to an aspect of the present disclosure, with axial slits in a facesheet having an "open" orientation;

FIG. 6A is an overhead plan view of a portion of the wing assembly shown in FIG. 5A, and according to an aspect of the present disclosure, with axial slits in a part having a "closed" orientation;

FIG. 6B is a cross-sectional side view of a portion of the wing assembly shown in FIG. 5B, and according to an aspect of the present disclosure, with axial slits in a part having a "partially open" orientation;

FIG. 6C is a cross-sectional side view of a portion of the wing assembly shown in FIG. 5C, and according to an aspect of the present disclosure, with axial slits in a part having an "open" orientation;

FIG. 7 is a flowchart showing a method according to an aspect of the present disclosure; and FIG. 8 is a flowchart showing a method according to an aspect of the present disclosure.

DETAILED DESCRIPTION

Shape Memory Alloy (SMA) actuators are an enabling technology for active acoustic liners, providing lightweight, compact systems capable of integrating directly into the liner elements. According to present aspects, if the SMA component must be structurally robust beyond the characteristics of the SMA material itself, the SMA component can comprise an SMA material embedded in another material that can remain inactive during the activation of the SMA material. As used herein, the term "SMA component" refers equivalently to a component comprised entirely of an SMA and to a component comprising a SMA that is combined with a structurally fortifying material that is not a SMA material and that may not itself have SMA characteristics. Such inactive fortifying materials that are thought to remain inactive upon activation of the SMA and into which a SMA can be embedded include, for example and without limitation aluminum, steel, titanium composite materials including carbon fiber composite materials, plexiglass, etc.

According to one aspect, when a variable porosity is desired for a substrate surface such as an acoustic liner, the SMA alloy component can be in communication with a plenum such that when the SMA alloy component is activated to expose at least a portion of the axial slit (e.g., at least a portion of the axial slit is "opened") wherein the plenum can act as a recirculation chamber allowing movement of the airflow from a higher pressure area of the variably porous substrate surface of a "facesheet" (equivalently referred to herein as a "panel") to a lower pressure area in order to tailor, trim and otherwise improve aerodynamics and performance in a predetermined and predictably way. For the purposes of the present disclosure, the term "panel", therefore includes facesheets and other structures found on the exterior of a larger structure. Presently disclosed panel assemblies (equivalently referred to herein as "panel assemblies") comprise a panel, or facesheet along with a proximately located SMA component that is immediately adjacent to the inner or interior surface of such panel (e.g., facesheet).

According to present aspects, tailoring the impact of an airflow at the surface of a part on an aircraft structure (e.g., a panel or panel assembly including facesheets on various aircraft surface structures, etc.) during flight, takeoff and landing, makes it possible to mitigate the effects of changing airflow turbulence at a part surface, including, for example, mitigating the strong transonic or other shocks on wings and other aerodynamic or acoustic surfaces, and to decrease operational noise, for example in flight and at takeoff and landing, etc.

When it is desired to reduce or mitigate the impact and location of shockwaves that would otherwise occur at a non-porous surface, airflow (referred to equivalently herein as "fluid" flow) can be re-directed from a high pressure region to a lower pressure region through the opening (e.g., axial slits, or openings of other geometries and dimensions, etc.) of the now variably porous panels, panel assemblies, etc., when the SMA components are activated to at least partially open the axial slits in the panels or other exterior surface structures. The re-direction of the airflow in this manner energizes the boundary layer, for example, at high angles of attack, and reduces the tendency of a turbulent airflow to separate from, for example, a wing, or other surface that can be an aerodynamic surface. In the case of a wing, the now variably porous wing surface can be adjusted or tailored in real-time to transport high pressure airflow located at the leading wing edge to regions of low pressure at the trailing edge in order to re-energize the boundary layer and improve performance including, for example, delaying stall.

According to further aspects, the facesheet or panel can include a metal, a ceramic, a composite material, as well as combinations thereof. In further aspects, when the facesheet is employed in a facesheet assembly designed for integration in an aircraft, the facesheet can be made from a material including, without limitation, at least one of aluminum, aluminum alloy, titanium, titanium alloy, carbon fiber reinforced plastic, boron fiber reinforced plastic; aramid fiber reinforced plastic, or combinations thereof.

According to a present aspect, an SMA is activated by a temperature change (e.g., for example by using direct current to induce joule heating for an SMA component, etc.), the SMA components incorporated into the presently disclosed variably porous facesheet assemblies or panel assemblies or structures, according to present aspects, include at least one of: a nickel titanium alloy, a binary nickel titanium alloy and combinations thereof. Further, an SMA useful in the facesheet assemblies of the present disclosure include at least one of: a ternary alloy comprising nickel and titanium along with at least one hafnium, iron, zirconium, gold and platinum. In further aspects, an SMA useful in the facesheet assemblies of the present disclosure can further include a quaternary alloy comprising nickel and titanium along with at least two of: hafnium, iron, zirconium, gold, platinum, and combinations thereof.

According to further aspects, when SMAs are activated by a magnetic force, or a magnetic field, useful SMA that can be incorporated into the variably porous facesheets, assemblies and systems presented herein include at least one of: a ternary alloy that includes nickel, titanium and manganese; and quaternary alloys that include nickel, titanium and manganese and at least one of: magnesium, gallium, cobalt, indium, tin, copper, and combinations thereof. When the actuating or activating force supplied to a SMA component is a magnetic field, according to present aspects, an electromagnet, magnetic array or other components and systems capable of exerting a magnetic field on the SMA component equivalent to about 0.5 to about 2.0 T are contemplated. A "Tesla" unit is understood to represent the standard unit of magnetic flux density. It is equivalent to one weber per meter squared (1 Wb. m$^2$). Reduced to base units in the International System of Units (SI), 1 T represents one kilogram per second squared per ampere (kg).

According to one aspect, the SMA selected is arranged in a moveably abutting orientation and is in contact with a panel inner surface, with the SMA itself having a low friction coefficient, or with the SMA incorporated into a material having a low friction coefficient (e.g., a polymeric, metallic or composite material, etc., having a low friction coefficient). It is further understood that the panel or facesheet inner surface can also have a low friction coefficient. As used herein, the term "low friction coefficient" of a material (e.g. the panel or facesheet, and the SMA component, etc.) refers to frictional forces at a material's surface ranging from about 1 lb. to about 10 lbs. being required to move surfaces of a particular material relative to another material surface.

The openings in the panels, according to aspects as shown herein in the FIGS. appear as axial slits having a rectangular geometry. However, the openings in the panels and, if desired, in the SMA components, can have any useful geometry and can be arranged in the panel and in the SMA component in any useful pattern (e.g., any pattern relative to one another), including oval, ellipses, spheres and even irregular geometries of varying sizes, shapes and dimensions. That is, the term "axial slit(s)" as used herein refers to any "opening" through the panel, panel assembly, facesheet, facesheet assembly, variably porous system, and/or SMA component, such that the terms "axial slit" and "opening" and "through opening" in their singular or plural forms are used equivalently herein when referring to an opening in the listed parts and/or assembly and or system.

The positioning of the SMA components proximate to and adjacent the panel inner surface, along with the predetermined control of specific activation sequences of the SMA components, achieves a desired and predetermined variable porosity in the panel assembly. For example, to achieve a desired degree of porosity for a particular facesheet occurring at a particular region or "zone" on an aircraft surface or aircraft component surface, a particular percentage of SMA components can be activated in substantially real time and/or according to a desired sequence, to open, partially open, or close a desired percentage of openings or a desired percentage of total opening area in a facesheet at any moment in time during a flight cycle.

In addition, if an aircraft comprises variably porous assemblies and variably porous surfaces at multiple locations over and throughout an aircraft surface, present aspects further contemplate substantially simultaneously controlling the porosity of various aircraft assemblies and aircraft surfaces located at various locations to achieve a tailored aerodynamic profile for the entire aircraft, or for discrete zones of an aircraft, that can change and adapt to changing airflow conditions, and deliver heightened flight efficiency in terms of fuel consumption, aerodynamic performance, propulsion performance, shockwave amelioration (e.g., dampening, etc.), shockwave elimination, decibel reduction, etc.

By way of example, in contrast to acoustic liners that have one "set" porosity, according to present aspects, acoustic liners that incorporate perforated facesheets having a variable porosity (e.g., located at engine intake assemblies and nacelles, etc.), accomplish a degree of desired noise attenuation, and can also contribute to the elimination or amelioration of aircraft flight performance inefficiencies, for example, due to excessive turbulence or "drag" from disrupted airflow at an aerodynamic surface boundary. During takeoff, landing and in flight, as airflow and aircraft velocities change, airflow boundary established at an outer substrate surface/airflow interface can deviate from a desired boundary profile, or otherwise change, causing airflow disruption leading to turbulent airflow impacting an otherwise aerodynamic surface, for example. Predictably altering the surface porosity of a surface component or assembly in real time maintains a desired airflow boundary profile.

In a further aspect, the SMA component desirably conforms to a mold line of an outer surface of an a part surface, such as an aerodynamic part including, for example, a wing, a fuselage, a stabilizer, an aileron, a wing flap, an engine nacelle, an engine intake, etc. To preserve aerodynamic performance of a particular aerodynamic surface, it is desirable for the SMA component in the variable porosity panel assemblies to remain "in-plane" with the associated panel and in-plane with the mold line. By remaining in-plane with the mold line, even during activation and a change in lengthwise or other dimension, the SMA components disclosed in present aspects minimize unwanted disruptions in airflow. That is, if the SMA components, upon activation changed dimension in a way that became out-of-plane with the mold line, the airflow turbulence that is sought to be avoided (by the use of a variably porous surfaces according to aspects of the present disclosure) could be exacerbated, thereby neutralizing the advantages of such a variably porous surface structure. Instead, according to present aspects, the SMA performs the function of changing the porosity of a surface panel (e.g., facesheet, etc.), by changing dimension and remaining immediately proximate to the inner surface of the panel, and "in-plane" with the mold line. Accordingly, at rest and during actuation the SMA does not protrude or deflect away (e.g., to an "out-of-plane" orientation) or otherwise deviate from the inner surface of a panel to which the SMA is associated, or from the mold line.

Indeed the SMA component can be installed in concert with a porous substrate or panel in an assembly installed at least on any aerodynamic member on an aircraft. For example, the variably porous facesheet sections with attached SMA components can be installed in a chord-wise and/or span-wise arrangement and can be activated separately or together into and out of similar or different states (e.g., degrees) of variable porosity relative to one another. When present, plenums associated with the facesheet/SMA component assemblies can be interconnected with one another (e.g., via fluid passageways), or the plenums can be discretely oriented such that they are fluidly isolated from one another.

According to further aspects, an actuator is in communication with the SMA and the SMA component. The actuator comprises or is in communication with components capable of delivering and controlling the delivery of an activating stimulus to convert the SMA material from a non-activated state to an activated state, or vice versa. For example, electrical current can be directed from an actuator to heating or cooling elements that are in communication with the SMA component for purpose of activating a change in the properties and dimensions of the SMA component.

In further aspects, the actuator comprises or is in communication with components able to deliver a magnetic field to the SMA component. In other aspects, the actuator itself comprises an electromagnet. As stated above, when the actuating or activating force supplied to a SMA component is a magnetic field, according to present aspects, an electromagnet, magnetic array or other components and systems capable of exerting a magnetic field on the SMA component equivalent to about 0.5 T to about 2.0 T are contemplated.

For example, when the SMA component incurs activation in the form of a temperature change, the SMA component will realize a size (e.g., dimension) reduction or increase and concurrently will change from a first "non-activated" state and first "non-activated" dimension through a range of a plurality of dimensions change to a second position and second dimension in the activated state. According to present aspects, the SMA component will move from an initial or first inactive or "non-active" position, (e.g., such as a position relative to the associated panel to "cover" the axial through slits present in a panel) to a second position where the axial slits in the panel are "open" or "partially open", allowing a predetermined amount of airflow to pass through the axial slits in the panel.

In other words, in a first position in a non-activated state, the SMA component will be aligned with the panel or otherwise positioned and oriented relative to the panel such that the SMA component will block the axial through slits in the panel, and the panel assembly is said to be in a "closed" position. As the SMA component is activated by an actuator that activates the SMA component (e.g., by heating or cooling the SMA component to a predetermined degree or by providing a magnetic field to the SMA component), the SMA component will realize a dimensional change in size (e.g., the SMA component will "shrink") and move to subsequent positions different from the first position (e.g., through a plurality of controllable and predetermined positions different from the first position) to a second position. As the SMA component moves from the first position toward a second position, the axial slits in the facesheet will no longer be blocked in the "closed" position", but will instead be opened to an "open position, or partially opened to a "partially open" position. In the "open" or "partially open" position, a predetermined amount of incident airflow will pass through the axial slits of the panel.

According to further aspects, SMAs can observe activation in a transformational temperature range such that SMAs can be selected, incorporated and tailored to be actuated at temperatures ranging from about −240° F. to about 575° F. Within this range, it is understood that SMA actuation can occur within a particular part of this range depending on the composition and processing of the selected SMAs. For example, when the SMA comprises Ni-rich NiTi, the transformational temperature range occurs down to temperatures ranging from about −100° F. to about 150° F. When the SMA comprises NiTiHf the transformational temperature range occurs up to temperatures ranging from about 400° F. to about 575° F.

Aspects of the present disclosure further contemplate useful variably porous assemblies comprising the SMA components able to be made using additive manufacturing (e.g., "3D manufacturing) techniques. Additive manufacturing techniques including Direct Metal Laser Sintering can be used to build complex actuation elements of SMA materials including NiTi and NiTiHf. Such elements are designed to simplify integration of the SMA component into the associated facesheet.

In addition to actuation involving actuators that deliver a temperature change to activate the SMA component, present aspects also contemplate actuators delivering and otherwise controlling the delivery of a magnetic force or field having an intensity that is able to activate the SMA component to a dimension change from a first dimension and first position, through a range of dimension and position changes to arrive at a second position (e.g., a magnetic force or field ranging from about 0.5 T to about 2.0 T) as described herein According to further aspects, the activation of the SMAs contemplated herein can be implemented to incorporate a number of actuators and activation modes including, without limitation electrical current to affect temperature changes concurrently with the application of a magnetic field. That is, multiple actuators and actuation types can be incorporated in the systems disclosed herein to achieve the desired tailorable material responses that will advantageously and predictably tailor, for example, the variable porosity changes to a substrate and substrate surface. While the actuators may be in communication with the SMA components, aspects of the present disclosure further contemplate integrating actuators into the SMA component, or into the panel assembly that comprises the SMA components.

Regarding the placement of a variably porous facesheet comprising the SMA component on aircraft control surfaces and control surface assemblies, certain present aspects are directed to the improvement of acoustic signature (e.g., the noise reduction) of the aircraft at various flight conditions including, for example, during takeoff and landing and junctures during flight cycles where vortices interacting with aircraft assemblies including, without limitation, flaps and engine intake structures generate noise. In this regard, present aspects contemplate activating the SMA component of a variable porosity facesheet assembly (e.g., panel assembly) to move the SMA component into, for example, a "closed" position (blocking the axial slits) during typical flight conditions other than landing or takeoff. However, during landing and/or takeoff, the SMA component is activated to move to a position such that the variably porous assembly is "open" or "partially open" to reduce an acoustic signature. Similarly, at times during flight where a change in velocity near Mach speed, 2× Mach speed, 3× Mach speed, etc., changing the porosity or aircraft surface structures, including aerodynamic surface structures in real time can ameliorate the intensity of, or eliminate the occurrence of shockwaves, as the typical behavior of airflow over an aircraft surface or portions of an aircraft surface is intentionally altered or interrupted.

With regard to noise reduction made possible by the presently-disclosed variably porous facesheet assemblies comprising the SMA component, the facesheet/SMA component assembly can modulate the opening and closing of the axial slits within a range equivalent to from near static up to about 10 Hz, for NiTi, or an SMA material having similar thermal activation characteristics to NiTi. Higher frequency operation can be realized using magnetically activated SMAs that can allow modulation at higher desired frequencies, for example significantly above 10 Hz.

A control mechanism comprising a controller is in communication with the SMA component actuator, or is integrated into the SMA component actuator. The controller is further in communication with, or itself comprises, hardware and software configured to regulate, modulate, sequence, etc., activation of the SMA component that affects the frequency of the opening and closing of the axial slits and the degree to which the axial slits are opened or closed. In one aspect, the controller can modulate and otherwise sequence the activation of the SMA component (e.g., the activation of the SMA component) in response and in correspondence to flight conditions of the aircraft including, for example, real-time flight conditions such as velocity, acceleration, angle of attack, structural airframe conditions, aircraft environmental conditions, etc. Such control mechanisms can be operated manually or automatically, with the required hardware and software able to operate the controllers remotely (e.g., wirelessly, etc.). Further the actuators can be controlled to operate in response to sensed conditions, or by way of anticipating changing aircraft flight conditions in response to or in anticipation of, for example, atmospheric changes, flight plans, mission protocols, etc.

As stated elsewhere herein, the variably porosity systems, according to present aspects, can be installed on any portion or region of any air vehicle including, without limitation, any type of private, commercial, military or space vehicle. Further, the variably porosity systems according to present aspects can be installed on any portion or region of any air vehicle including, without limitation, engines, engine assemblies (e.g., including engine inlets and nacelles), wings, wing assemblies and other lifting, non-lifting and other flight control surfaces and regions including flaps, ailerons, rudders, stabilizers, canards, winglets fuselage body, or any other aerodynamic surface and assembly.

As shown in FIG. 1A, is an illustration of a panel assembly 10 including a panel 12 having axial slit openings, or axial slits 14 according to aspects of the present disclosure. The panel can comprise a metal or a non-metal, with suitable materials including, but not limited to aluminum, an aluminum alloy, titanium, a titanium alloy, a ceramic material, a composite material, and combinations thereof, etc. FIG. 1A shows an interior view of the panel 12 in a non-actuated state with axial slits 14 in a "closed" position. The axial slits 14 provide openings through panel 12. While shown as rectangular openings, the slits (e.g., axial slits) represent openings through the panel that have any desired geometric shape, dimension and/or any pattern located on throughout the area of the panel. Shape memory alloy components 16 (referred to equivalently herein as "SMA" component(s)) are shown located proximate to a panel interior surface 12a of the panel 12. As shown, shape SMA components 16 are each in communication with actuators 17, 17a that as shown in FIGS. 1A, 1B, and 1C are in the form of a thin-film electric heater. Actuators 17, 17a are in turn in communication with a controller 19 via leads 18. The SMA components 16 are in communication with the controller 19. The controller 19 can comprise or otherwise be in communication with the actuator 17, 17a (equivalently referred to herein as "actuation mechanism" or "actuation means") associated with or integrated into the SMA component. The controller facilitates an activated condition to the SMA component such as, for example, a preselected, controllable and tailorable amount of current, an amount of heat or cooling, or a magnetic field having a desired intensity or field strength. The activated condition can be applied to the SMA component over a desired period of time, which may be programmable or otherwise controlled by the controller. The controller may also be integrated into the actuator, or may be in communication with the actuator via a physical connection, or remotely (e.g., wirelessly, etc.). As shown in FIG. 1A the length of SMA component 16 is represented as having length "d1" in a non-actuated state.

FIG. 1B shows the panel assembly shown in FIG. 1A, including panel 12 where the controller 19 has been engaged (or equivalently "actuated" or "activated") to deliver a changing condition via actuators to the SMA component(s). By way of example, in FIG. 1B, controller 19 can control actuators 17,17a to deliver a temperature increase to SMA component 16. The temperature increase delivered to the SMAs 16 by the thin-actuators 17, 17a, (e.g., actuators 17, 17a shown in the form of thin-film electric heaters) triggers a transformation in the structure of the SMA in the SMA components 16 that causes the SMA components 16 to change dimension in a predetermined, and predictably measurable fashion. As shown in FIG. 1B, the lengthwise dimension of the SMA components 16 are reduced such that the SMA components effectively "shrinks" in the lengthwise direction. The reduced lengthwise dimension of the SMA components partially exposes a portion of the axial slits 14.

As shown in FIG. 1B, the axial slits 14 are said to be in a "partially open" position. As shown in FIG. 1B the length of SMA component 16 in represented as having length "d2" in the "partially open" actuated state. According to present aspects illustrated in the FIGS., length d2 of the SMA component is understood to be less than the original length d1 of the SMA component in the non-actuated state (shown in FIG. 1A).

As the actuators continue to deliver a particular temperature change to the SMA components over an extended amount of time, or as the actuator delivers an increasing temperature to the SMA components, the SMA components will continue to predictably change dimension. FIG. 1C shows the panel assembly 10 shown in FIGS. 1A and 1B including panel 12 where the controller 19 directs and controls the actuators 17, 17a (e.g., actuators 17, 17a shown in the form of thin-film heaters) to deliver a changing condition to the SMA components 16. By way of example, in FIG. 1C, actuators 17, 17a are shown delivering a temperature increase to SMA components 16. The temperature increase delivered by the actuators to the SMA components (and controlled by controller 19) causes the SMA components to continue to change dimension in a predetermined and predictably measurable fashion. As shown in FIG. 1C, the lengthwise dimension of the SMA components 16 are now further "activated" and reduced such that the SMA component effectively "shrinks" in the lengthwise direction to substantially completely expose the area of the axial slits 14. As shown in FIG. 1C, the axial slits 14 are said to be in an "open" position. As shown in FIG. 1C the length of SMA component 16 in represented as having length "d3" in the "open" actuated state. According to present aspects illustrated in the FIGS., length d3 of the SMA component is understood to be less than the original length d1 of the SMA component in the non-actuated state (shown in FIG. 1A), and less than the length d2 of the SMA component in the "partially open" actuated state (shown in FIG. 1B).

FIGS. 2A, 2B and 2C show a front view of the panel assemblies 10 shown in FIGS. 1A, 1B and 1C respectively. As shown in FIG. 1A, in a non-actuated state, the axial slits 14 shown from the view of the panel exterior surface 12b of panel 12 are "blocked" by the SMA component and the axial slits 14 are said to be in a "closed" position. In the "closed" orientation, the axial slits 14 would impede, or otherwise not allow an amount of through flow of an impacting fluid flow through the panel at the location of the axial slits such as, for example, an airflow impacting the panel surface.

FIG. 2B is an illustration of a front view of the panel 12 of FIG. 1B showing the axial slits 14 shown from the view of the panel exterior surface 12b of panel 12 in a "partially open" position, as the SMA component has now been actuated to a degree that the SMA component has changed shape and reduced its lengthwise dimension such that a portion of the area of the axial slits 14 in panel 12 are now partially exposed, or "partially open". In the "partially open" orientation, the axial slits 14 would allow a desired amount of through flow of an impacting fluid flow through the panel at the partially open axial slits such as, for example, an amount of airflow impacting the panel surface. In this way, as shown in FIGS. 1B and 2B, the porosity of the panel surface at the area of the axial slits has been changed as compared to the porosity of the panel shown in FIGS. 1A and 2A.

FIG. 2C shows a front view of the panel exterior surface 12b of panel 12 as shown in FIG. 1C, where the controller 19 remains engaged (or "actuated" or "activated") to control a changing condition to the SMA components 16 via actuators (actuators not visible in FIGS. 2A, 2B, and 2C, but shown as thin-film heaters in FIGS. 1A, 1B, and 1C). By way of example, in FIG. 2C, controller 19 is shown controlling a temperature increase that is delivered to SMA components 16 via actuators. The temperature increase delivered by the actuator to the SMA components causes the SMA components to continue to change dimension in a predetermined and predictably measurable fashion. As shown in FIGS. 1C and 2C, the lengthwise dimension of the SMA components 16 are now reduced such that the SMA component effectively "shrinks" in the lengthwise direction to substantially completely expose the area of the axial slits 14. In this "open" orientation, the axial slits 14 would allow a desired amount of through flow of an impacting fluid flow through the panel at the now open axial slits such as, for example, an amount of airflow impacting the panel surface. In this way, as shown in FIGS. 1C and 2C, the porosity of the panel surface at the area of the axial slits has been changed as compared to the porosity of the panel shown in FIGS. 1A, 2A and 2A, 2B.

FIG. 3 is an illustration of an aircraft 40 according to an aspect of the present disclosure. As shown in FIG. 3, aircraft 40 includes features typically found on an aircraft including, without limitation, aerodynamic surface 41, engine assembly 42 having an engine inlet 43, wing 44 having a wing leading edge 44a, wing slats 44b, a trailing edge 45, ailerons 48, horizontal stabilizer 49a, vertical stabilizer 49b and rudder 49.

FIG. 4 is an illustration of a cross-sectional side view of a wing assembly 44 taken across line 4-4 shown in FIG. 4. As shown in FIG. 4, wing 44 includes a leading edge 54 and a trailing edge 56. A boundary 52 extending across the upper surface (e.g., the high pressure surface) of the wing 44 represents a region of impacting airflow and commensurate airflow conditions during flight that associates with and otherwise impacts the upper surface of wing 44. Wing panel section 58 is shown in enlarged representative views in FIGS. 5A, 5B and 5C. The wing panel section 58, as shown, comprises a wing panel assembly (shown as part 61 in FIGS. 6A, 6B, 6C, 7A, 7B and 7C herein), with the wing panel section and wing panel assembly having the presently disclosed variably porous systems FIG. 5A shows an enlarged cross-sectional representative side view of the wing panel section 58 as shown in FIG. 4. Wing panel section 58 includes wing panel assembly 61 including SMA component 64 located proximate to the underside or proximate to the wing panel facesheet inner surface 62b of wing panel facesheet 62. Together, the wing panel facesheet 62 and associated SMA component 64 form a wing panel assembly 61 that operates to produce a variably porous surface. As shown in FIG. 5A, the length of SMA component 64 is represented as having length "d1" in a non-activated state (equivalently referred to herein as a "non-actuated" state). FIG. 5A further shows wing panel facesheet 62 having facesheet axial slits 63 extending through the thickness of wing panel facesheet 62 (e.g., from the wing panel facesheet outer surface 62a to the wing panel facesheet inner surface 62b). SMA component 64 is shown having openings that can be SMA component axial slits 65 extending through the thickness of the SMA component 64. In a non-activated state, shown in FIG. 6A as the "closed" orientation, the facesheet axial slits 63 and SMA component axial slits 65 are offset such that the wing panel assembly 61 does not provide a through path for fluid flow (e.g., airflow) through both the facesheet 62 and the SMA component 64.

As shown in FIG. 5B, the length of SMA component 64 is represented as having length "d2" in an activated state (equivalently referred to herein as an "actuated" state). FIG. 5B further shows wing panel facesheet 62 having axial slits 63 extending through the thickness of wing panel facesheet 62. SMA component 64 is shown having openings that can be SMA component axial slits 65 extending through the thickness of the SMA component 64. In the activated state shown in FIG. 6B, the SMA component 64 changes dimension and "moves" such that the SMA component axial slits 65 in the SMA component 64 partially align with the facesheet axial slits 63 in wing panel facesheet 62 to form a "partially open orientation in wing panel assembly 61. In this "partially open" orientation, the length of SMA component is now represented as "d2", with "d2" understood to be a value less than "d1". In this "partially open orientation, a partial through path for fluid flow (e.g., airflow) is provided through both the facesheet 62 and the SMA component 64. In this way, the wing panel assembly 61 now has a porosity that is different from the wing panel porosity shown in FIG. 5A (showing the "closed" orientation).

As shown in FIG. 5C, the length of SMA component 64 is now represented as having length "d3" in the activated state. FIG. 5C further shows wing panel facesheet 62 having facesheet axial slits 63 extending through the thickness of wing panel facesheet 62. SMA component 64 is shown having openings that can be SMA component axial slits 65 extending through the thickness of the SMA component 64. In the activated state shown in FIG. 5C the SMA component 64 changes dimension again, and "moves" such that the SMA component axial slits 65 in the SMA component 64 substantially align with the facesheet axial slits 63 in wing panel facesheet 62 to form an "open" orientation in wing panel assembly 61. In this "open" orientation, the length of SMA component is now represented as "d3", with "d3" understood to be a value less than "d2" and "d1". In this "open" orientation, a through path for fluid flow (e.g., airflow) is provided through both the facesheet 62 and the SMA component 64, with the through path being substantially equal to the area of the axial slit 63 in wing panel facesheet 62. In this way, the wing panel assembly 61 now has a porosity that is different from the wing panel porosity shown in FIGS. 5A and 5B (showing the "closed" and "partially open" orientations, respectively).

FIGS. 6A, 6B and 6C are overhead representative exterior views of the wing panel facesheets shown in FIGS. 5A, 5B and 5C respectively. As shown in FIG. 6A, wing panel section 58 includes a wing panel facesheet 62 having a wing panel facesheet exterior 62a, and facesheet axial slits 63 extending through the thickness of the wing panel facesheet 62. SMA components 64 are visible through the facesheet axial slits 63, with the SMA components 64 being in a non-actuated state, having a lengthwise dimension of "d1" (not shown in FIG. 6A). As shown in FIGS. 5A and 6A, the wing panel assembly 61 is shown in the "closed" orientation such that wing panel assembly 61 does not provide a through path for fluid flow (e.g., airflow) through both the wing panel facesheet 62 and the SMA component 64.

As shown in FIG. 6B, wing panel section 58 includes a wing panel facesheet 62 having a wing panel facesheet exterior 62a, and facesheet axial slits 63 extending through the thickness of the wing panel facesheet 62. While a portion of the SMA components 64 are visible through the axial slits 63, with the SMA components are now in an activated state, having a lengthwise dimension of "d2" (not shown in FIG. 6B). As shown in FIGS. 5B and 6B, the panel assembly 61 is now shown in the "partially open" orientation such that assembly 61 provides a partial through path for fluid flow (e.g., airflow) through both the facesheet 62 and the SMA component 64 via partially open axial slits 63. In this way, the panel assembly 61 shown in FIG. 6B now has a porosity that is different from the wing panel porosity shown in FIG. 6A.

As shown in FIG. 6C, wing panel section 58 includes a wing panel facesheet 62 having a wing panel facesheet outer surface 62a, and facesheet axial slits 63 extending through the thickness of the wing panel facesheet 62. The SMA components 64 are now in an activated state, having a lengthwise dimension of "d3" (not shown in FIG. 6C, but shown in FIG. 5C). In the activated state shown in FIGS. 5C and 6C, the SMA component 64 changes dimension again, and "moves", such that the SMA component axial slits 65 in the SMA component 64 substantially align with the axial slits 63 in wing panel faceheet 62 to form an "open" orientation in wing panel assembly 61. In this "open" orientation, the length of SMA component is now represented as "d3" ("d3" not shown in FIG. 6C), with "d3" understood to be a value less than "d2" and "d1". In this "open" orientation, a through path for fluid flow (e.g., airflow) is provided through both the facesheet 62 and the SMA component 64, with the through path being substantially equal to the area of the facesheet axial slit 63 in wing panel facesheet 62. In this way, the wing panel assembly 61 now has a porosity that is different from the wing panel porosity shown in FIGS. 5A, 6A and FIGS. 5B, 6B (showing the "closed" and "partially open" orientations, respectively).

FIG. 7 is a flowchart showing a method 100 according to an aspect of the present disclosure, with the method 100 including providing 101 a part comprising a substrate and a SMA component, activating 102 (equivalently referred to herein as "activating") the SMA component, changing 104 the dimension of the SMA component. The method outlined in FIG. 7 further comprises maintaining 105 the SMA component in-plane with the substrate mold line, and changing 106 the porosity of the part (e.g., the part comprising the SMA component). The method outlined in FIG. 7 can be used in connection with the panels, panel assemblies and systems shown in any one or more of FIGS. 1A, 1B, 1C, 2A, 2B, 2C, 3, 4, 5A, 5B, 5C, 6A, 6B and 6C.

FIG. 8 is a flowchart showing a method 200 according to an aspect of the present disclosure, with the method 200 including positioning 202 a SMA-containing element (e.g., a SMA component) proximate to a substrate surface; activating 204 (equivalently referred to herein as "activating") the SMA-containing element, changing 206 the SMA-containing element dimension, and changing 208 the porosity of the substrate surface. The method outlined in FIG. 8 can be used in connection with the panels, panel assemblies and systems shown in any one or more of FIGS. 1A, 1B, 1C, 2A, 2B, 2C, 3, 4, 5A, 5B, 5C, 6A, 6B and 6C.

EXAMPLE 1

A variable porosity facesheet panel for an acoustic liner was created by employing an in-plane actuator incorporated into the facesheet panel structure. A Shape Memory Alloy (SMA) element capable of changing dimensions when activated is integrated into a passive facesheet panel of an acoustic liner. When the SMA element is not activated it covers slits cut into the facesheet panel, creating a solid (non-porous) surface. When the SMA element is activated it changes dimensions to expose the slits, creating a porous surface. Multiple SMA elements are incorporated into a facesheet panel as required to control porosity. Some of the key elements of a complete active face sheet system include the active SMA element, thermal management components, sensors (temperature, motion/deflection), control hardware and software, and supporting structure and integration. FIGS. 1A, 1B and 1C show the SMA element, thermal management components and supporting structure in a demonstration test of the axial slit concept.

FIG. 1A shows a multi-element in-plane axial slit demonstrator. The axial slit demonstrator incorporated three nickel titanium (NiTi) axial elements—based on the configuration above description for a single element embedded into one passive frame. The three active elements for the demonstrator were processed for two-way shape memory effect (TWSME) and dimensional stability prior to installation into the facesheet panel. The active change in length of these active elements was approx. 0.03 in (as governed by 2.75% actuation strain, under no-load, from available TWSME). FIG. 1B shows the embedding of the active elements into an in-active composite sheet and thin-film electric heaters 17, 17a. In a test setup for the multi-element in-plane active slit system, a thermocouple was mounted between the thin-film electric heater and center element. A constant voltage was applied to the heater pack in order to heat the active elements. FIGS. 2A, 2B and 2C show front views of the facesheet panel assemblies shown in FIGS. 2A and 2B, with the NiTi element deactivated with the slits closed (FIG. 2A at time=0 seconds); partially activated (FIG. 2B at time equal to about 15 seconds) with slits "open" to 0.015"; and fully activated with slits "open" to 0.030" (FIG. 2C at time equal to about 30 seconds).

While the SMA components disclosed herein have been described as reducing or decreasing their dimensions upon activation by temperature change or by applying a magnetic field, aspects of the present disclosure further contemplate SMAs that could also increase their dimension upon their activation. That is, if an SMA were to increase dimension upon activation, according to further contemplated aspects, SMAs and SMA components incorporated into the variably porous facesheet panel assemblies described herein could provide a facesheet panel assembly that is in the "open" position when the SMA is not activated. Upon activation, if an SMA is used that increases in dimension upon activation, SMA component comprising such an SMA would move from the (non-active) "open" position, and, upon activation, would change and increase dimension to first "partially close" the opening in the facesheet, and then substantially completely "close" the opening in the facesheet, etc.

While the panel assemblies, systems and method of the present disclosure have largely been described as pertaining to aircraft, further aspects of the present application disclose vehicles that include the panels, panel assemblies systems and methods as described herein, with the vehicles including at least one of: a manned aircraft; an unmanned aircraft; a manned spacecraft; an unmanned spacecraft; a manned rotorcraft; an unmanned rotorcraft; a manned terrestrial vehicle; a unmanned terrestrial vehicle; a unmanned terrestrial vehicle; a manned hovercraft; an unmanned hovercraft; a manned surface water borne vehicle; an unmanned surface water borne vehicle; a manned sub-surface water borne vehicle; an unmanned sub-surface water borne vehicle; and further incorporating the presently disclosed panels and panel assemblies on missiles, satellites, and the like.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to at least one of each of the items in the list (e.g., at least one of A and at least one of B).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A panel assembly comprising:
a panel, said panel comprising:
a panel inner surface;
a panel outer surface, and
at least one panel through opening;
a shape memory ahoy component, said shape memory alloy component in contact with the panel inner surface, said shape memory alloy component having a first dimension in a non-activated state and said shape memory alloy component having at least a second dimension or a plurality of dimensions in an activated state, said second dimension or plurality of dimensions different from the first dimension, said shape memory alloy component comprising a plurality of axial slits, said axial slits having an initial orientation in the non-activated state;
wherein the shape memory alloy component in the non-activated state and in the activated state is maintained in an orientation in contact with the panel inner surface;
wherein, in the activated state, the second dimension of the shape memory alloy at least partially aligns one axial slit with the panel through opening; and
wherein said panel assembly comprises an initial porosity in a non-activated state, and said panel assembly comprises at least one variable porosity in an activated state, said variable porosity different from the initial porosity.

2. The panel assembly of claim 1, further comprising:
an actuator in communication with the shape memory alloy component.

3. The panel assembly of claim 2, wherein the actuator comprises at least one of:
a heating element, a cooling element, and a magnet.

4. The panel assembly of claim 1, further comprising a controller in communication with an actuator.

5. The panel assembly of claim 1, wherein the panel comprises at least one of: a metal, a ceramic, a composite material, and combinations thereof.

6. The panel assembly of claim 1, wherein the panel comprises at least one of: aluminum, aluminum alloy, titanium, titanium alloy, carbon fiber reinforced plastic, boron fiber reinforced plastic; aramid fiber reinforced plastic, and combinations thereof.

7. The panel assembly of claim 1, wherein the shape memory alloy component comprises at least one of: a nickel titanium alloy, a binary nickel titanium alloy, and combinations thereof.

8. The panel assembly of claim 1, wherein the shape memory alloy component further comprises at least one of: a ternary alloy comprising nickel and titanium and at least one of: hafnium, iron, zirconium, gold and platinum; and a quaternary alloy comprising nickel and titanium and at least two of hafnium, iron, zirconium, gold, platinum, and combinations thereof.

9. The panel assembly of claim 1, wherein the shape memory alloy component further comprises at least one of: a ternary alloy comprising nickel, titanium and manganese; and a quaternary alloy comprising nickel and titanium and manganese, and at least one of: magnesium, gallium, cobalt, indium, tin, copper, and combinations thereof.

10. An aircraft assembly comprising the panel assembly of claim 1.

11. A variably porous system for a vehicle surface, said system comprising:
   a panel, said panel comprising a panel inner surface and a panel outer surface, said panel outer surface comprising a mold-line, and said panel further comprising at least one opening through said panel;
   a shape memory alloy component, said shape memory alloy component in contact with the panel inner surface, said shape memory alloy component having a first dimension in a non-activated state and said shape memory alloy component having at least a second dimension or a plurality of dimensions in an activated state, said second dimension or plurality of dimensions different from the first dimension, said shape memory alloy component comprising a plurality of axial slits said axial slits having an initial orientation in the non-activated state;
   an actuator in communication with the shape memory alloy component;
   a controller in communication with the shape memory alloy component;
   wherein the shape memory alloy component in the non-activated state and in the activated state is maintained in an orientation in contact with the panel inner surface;
   wherein, in the activated state, the second dimension of the shape memory alloy at least partially aligns one axial slit with the panel through opening; and
   wherein the shape memory alloy component in the non-activated state and in the activated state is maintained in an orientation in contact with the panel inner surface.

12. The variably porous system of claim 11, wherein the actuator comprises at least one of:
   a heating element, a cooling element, and a magnet.

13. The variably porous system of claim 11, wherein the panel comprises at least one of: aluminum, aluminum alloy, titanium, titanium alloy, carbon fiber reinforced plastic, boron fiber reinforced plastic; aramid fiber reinforced plastic, and combinations thereof.

14. The variably porous system of claim 11, wherein the shape memory alloy component comprises at least one of: a nickel titanium alloy, a binary nickel titanium alloy, and combinations thereof.

15. The variably porous system of claim 11 wherein the shape memory alloy component further comprises at least one of: a ternary alloy comprising nickel and titanium and at least one of: hafnium, iron, zirconium, gold and platinum; and a quaternary alloy comprising nickel and titanium and at least two of hafnium, iron, zirconium, gold, platinum, and combinations thereof.

16. The variably porous system of claim 11, wherein the shape memory alloy component further comprises at least one of: a ternary alloy comprising nickel, titanium and manganese; and a quaternary alloy comprising nickel and titanium and manganese, and at least one of: magnesium, gallium, cobalt, indium, tin, copper, and combinations thereof.

17. An aircraft comprising the variably porous system of claim 11.

18. A method for changing porosity of a part, said method comprising:
   providing a part having a first porosity, said part comprising a substrate, said substrate comprising a substrate inner surface and a substrate outer surface, said substrate further comprising at least one substrate through opening, and said part further comprising a shape memory alloy component, said shape memory alloy component in contact with the substrate inner surface, said shape memory alloy component having an initial dimension in a non-activated state and said shape memory alloy component having at least a second dimension in an activated state, said second dimension differing from the initial dimension, said shape memory alloy component comprising a plurality of axial slits said axial slits having an initial orientation in the non-activated state;
   activating the shape memory alloy component to form the shape memory alloy component in the activated state;
   changing the dimension of the shape memory alloy component from the initial dimension to the second dimension;
   maintaining the shape memory alloy component in an orientation in contact with the substrate inner surface when the shape memory alloy component is in the non-activated state and the activated state;
   changing the porosity of the part;
   wherein the shape memory alloy component in the non-activated state and in the activated state is maintained in an orientation in contact with the substrate inner surface; and
   wherein, in the activated state, the second dimension of the shape memory alloy at least partially aligns one axial slit with the substrate through opening.

19. The method of claim 18, further comprising: applying a current to the shape memory alloy component.

20. The method of claim 18, further comprising: applying a magnetic field to the shape memory alloy component.

21. The method of claim 18, further comprising:
   exposing the shape memory alloy component to a temperature change.

22. The method of claim 20, wherein said magnetic field ranges from about 0.5 T to about 2.0 T.

* * * * *

UNITED STATES PATENT AND TRADEMARK OFFICE
CERTIFICATE OF CORRECTION

PATENT NO. : 11,286,042 B2
APPLICATION NO. : 16/100412
DATED : March 29, 2022
INVENTOR(S) : Frederick T. Calkins, Douglas E. Nicholson and Jordan R. Kreitzman It is certified that error appears in the above-identified patent and that said Letters Patent is hereby corrected as shown below:

In the Claims

Column 17, Line 31, delete "shape memory alloy component", insert --actuator--, therefor.

Signed and Sealed this
Fifth Day of July, 2022

Katherine Kelly Vidal
*Director of the United States Patent and Trademark Office*